United States Patent [19]
Ortiz et al.

[11] Patent Number: 5,243,615
[45] Date of Patent: Sep. 7, 1993

[54] HIGH-POWERED INTRACAVITY NON-LINEAR OPTIC LASER

[75] Inventors: Mark V. Ortiz, San Jose; Dirk J. Kuizenga, Sunnyvale; Steven C. Murray, Menlo Park; John H. Fair, Fremont, all of Calif.

[73] Assignee: Laserscope, San Jose, Calif.

[21] Appl. No.: 796,084

[22] Filed: Nov. 20, 1991

[51] Int. Cl.⁵ .................................. H01S 3/04
[52] U.S. Cl. ........................ 372/34; 372/72; 372/68; 372/6; 372/40; 372/41; 372/69; 372/22; 372/21
[58] Field of Search ............ 372/21, 22, 10, 68, 372/108, 25, 69, 72, 6, 40, 41

[56] References Cited

U.S. PATENT DOCUMENTS

| | | | |
|---|---|---|---|
| 3,673,504 | 6/1972 | Hilberg | 372/10 |
| 4,337,442 | 6/1982 | Mauck | 372/69 |
| 4,910,746 | 3/1990 | Nicholson | 372/68 |
| 4,930,901 | 6/1990 | Johnson et al. | 372/25 |
| 5,016,251 | 5/1991 | D'Arcy | 372/10 |
| 5,025,446 | 6/1991 | Kuizenga | 372/21 |
| 5,130,997 | 7/1992 | Ortiz et al. | 372/108 |
| 5,151,909 | 9/1992 | Davenport et al. | 372/22 |

Primary Examiner—Leon Scott, Jr.
Attorney, Agent, or Firm—Fliesler, Dubb, Meyer & Lovejoy

[57] ABSTRACT

Power output and power conversion efficiency of an intracavity non-linear optical laser is substantially increased by reducing the effect of thermal focussing per unit of pump energy enabling a stable resonator cavity at high input powers by utilizing a closely coupled reflector, multi-gain media configuration, and various pump source filters and/or semiconductor laser diode pumping.

102 Claims, 9 Drawing Sheets

HIGH-POWERED INTRACAVITY NON-LINEAR OPTIC LASER

IDENTIFICATION OF RELATED APPLICATION

This Application is related to U.S. patent applicant Ser. No. 689,356 entitled "Frequency Doubled Solid State Laser having Programmable Pump Power Modes and Method for Controllable Lasers" by S. Davenport, et al.. filed Mar. 22, 1991, now U.S. Pat. No.5,151,909.

BACKGROUND OF THE INVENTION

This invention relates to lasers including intracavity non-linear optics (NLO). More particularly, the present invention relates to an improved laser including an NLO which enables substantial increases in average power output and NLO conversion efficiency.

DESCRIPTION OF RELATED ART

Intracavity NLO lasers are used in a variety of medical, surgical, and industrial applications. Several types of solid state lasers are used in these applications; such as the Nd:YAG laser with a primary wavelength of 1064 nm in the near infrared. Other typical solid state gain materials are Nd:YLF and Nd:Glass. Generally, a non-linear medium, such as potassium titanyl phosphate KTiOPO4 (KTP), lithium triborate LiB$_3$O$_5$ (LBO), Beta-barium borate $\beta$-BaB$_2$O$_4$ (BBO) crystals, or a polled-glassy-state material, is mounted in the optical path inside the laser resonator in order to extract harmonics of the frequency of the resonating beam or other frequencies of light by summing and/or differencing various laser beams.

One useful surgical system uses a KTP crystal to extract a second harmonic 532 nm green output from a 1064 nm Nd:YAG laser source. The output beam is delivered to a patient's tissue through an optical fiber or other delivery system. The main advantage of the 532 nm wavelength is that it is strongly absorbed by the hemoglobin in blood and hence useful for cutting, vaporizing, and coagulating vascular tissue. A frequency doubled Nd:YAG laser suitable for such uses is described by P. E. Perkins and T. S. Fahlen in *JOSA*, Vol. 4, pp. 1066-1071 (1987), and advanced designs are described in U.S. Pat. No. 4,907,235, issued to D. Kuizenga on Mar. 6, 1990 (hereinafter the "Kuizenga patent") and U.S. patent application Ser. No. 689,356 filed Mar. 22, 1991 by S. Davenport, et al. These prior art surgical laser systems have produced approximately 20 W of average power output at 532 nm.

Numerous applications would benefit from a high-powered intracavity NLO laser. For example, surgical applications would be enhanced by increased cutting rates. Other enhanced applications include high-speed photography, isotope separation, solid state laser pumping for medical, scientific, and industrial uses, laser lighting, communication under sea, and perhaps lidar.

Increases in power output of intracavity NLO lasers in the prior art has been slow and incremental. T. S. Fahlen and P. E. Perkins introduced a 20 W frequency doubled Nd:YAG laser system in "Material and medical applications using a 20-W frequency doubled Nd:YAG Laser," Digest of Conference on Lasers and Electrooptics, p. 134, (Optical Society of America, Washington, D.C., 1984).

Chaoen, et al. claims to have made a 33 W green laser system in *Chinese Physics-Lasers*, Vol. 15, pp. 726-729 (1988). The Chaoen disclosure shows a conventional "L" shape resonator configuration with an elliptical reflector which focusses the 4 kW Kr pumping lamp on a single YAG rod. While the Chaoen paper lacks the necessary details enabling one skilled in the art to repeat the experiment, Chaoen claims an initial 532 nm output power of 33-34 W and an initial conversion efficiency of 0.85% which degrades to below 25 W with a conversion efficiency of 0.60% after the first 15 hours of use.

Further improvements of power output have been reported by J. Q. Yao, et al. in "High Power Green Laser by Intracavity Frequency Doubling with KTP Crystal" in *SPIE*, Vol. 1021, p. 181, High Power Solid State Lasers (1988). Yao claims a 532 nm average output power of 34.2 W. This resonator design employs a single YAG rod which is CW or Quasi-CW pumped by two Kr. lamps. The Yao disclosure does not mention a particular lamp/rod housing configuration or other enabling details in achieving these powers.

In addition to the 1064 nm line described above, there are other lines in YAG that can be used for high average power second harmonic generation. One line in particular at 1318 nm has been used to generate the second harmonic at 659 nm. While little has been published on high power generation at 659 nm, A. A. Balman, et al. in "Growth of KTP from Molten Tungstate Melts," *J. Crystal Growth* Vol. 75, p. 390 (1986), and R. F. Belt, et al. in "KTP as a Harmonic Generator for Nd:YAG Lasers," *Laser Focus* Vol. 21, p. 110 (1985) have shown that KTP can be used in producing a second harmonic at 659 nm.

High power output of intracavity NLO lasers has been limited to a large degree by thermal effects associated with the laser gain medium. In a typical laser resonator design, a pump power source, such as an arc lamp, pumps energy into the gain medium rod. Typically, in the prior art, either a single ellipse or double ellipse reflector encompasses the lamp and rod such that a foci of the ellipse reflector is positioned at the center of the rod. This enables the lamp to concentrate its emissions at the center of the rod. While the rod is being pumped, it is also cooled with water on the outside surface. During pumping, a thermal gradient is induced in the rod, with a maximum temperature at the center of the rod and lowest temperature at the outside surface where it is in contact with the water. This temperature gradient produces a thermal lens in many solid state media, such as Nd:YAG, and the dependency of the focal length of this thermal lens on the laser pump power complicates the design of the laser. Thermal focussing is described in detail by W. Koechner in *Applied Optics*, Vol. 9, pp. 1429-1434, and pp. 2548-2553 (1970). The Kuizenga patent discusses the design of a laser with thermal focussing.

Two significant aspects of thermal focussing should be considered. First, the intracavity NLO laser of the Kuizenga patent is designed to have a stable optic resonator over a limited range of thermal focussing. At the low level end of pumping, the laser has weak thermal focussing and this may mean the laser resonator is not stable. In that case, some minimum amount of pump power (possibly significantly higher than the theoretical laser threshold) is required to provide sufficient thermal focussing to make the resonator stable. In general, this means that more pump power has to be used to get stable and reliable output from the laser.

It is possible, however, to design a resonator that is stable even without any thermal focussing in the Nd:YAG rod. This can be done, for example, by changing the radius of curvature of some of the mirrors in the resonator.

In general, however, making the resonator more stable at low power will then make the resonator more susceptible to thermal focussing at high power and the effect due to high levels of pump power will become noticeable at a lower power input. Therefore, the laser resonator design becomes a compromise between the range of resonator stability and thermal effect at high pump power. In addition, the resonator design must take into account the constraints of focussing the beam into a certain diameter fiber with a given numerical aperture.

Second, at the high level end of pumping, the gain in power output will become unstable beyond a certain input power or lamp current input. At a point, power output will actually decrease with increased lamp current and then begin to rise again. The point at which power output begins to decrease has been defined as the "foldback point." The region in the power output curve beyond the "foldback point" where power decreases and then continues to rise again has been defined as the "foldback region." Power of output pulses throughout the entire "foldback region" is unstable in prior art designs. This instability of power in output pulses in the "foldback region" is due to complex factors causing resonator losses, Q-switching dynamics, and other thermal focussing induced phenomena. Thus, prior art intracavity NLO systems were unable to work in or beyond the "foldback region" due to the instability of the power output pulses brought on by unstable thermal focussing.

Another thermal property of Nd:YAG, Nd:YLF, and some other solid-state laser materials is that the gain decreases as the temperature of the laser material increases. In a typical Nd:YAG laser system, for example, the output power starts to drop significantly due to this drop in gain as the laser cooling water temperature goes above 80° to 90° F.

Another limitation of power output in intracavity NLO laser systems concerns the spot size requirement on the non-linear optic in attempting to operate at high power. For instance, damage to the non-linear optic can result if the power density within the non-linear optic becomes too great. Since power density is in at least one aspect a function of spot size, controlling the spot size of the beam at the point of interaction with the non-linear crystal is critical. Thus, the design of the resonator for intracavity design must involve consideration of the spot size at the nonlinear optic, in addition to analysis of thermal focussing stability. The Kuizenga patent referred to above provides a detailed description of a successful technique for controlling spot size in the NLO.

Other components of intracavity NLO laser systems are also involved in the resonator design. The non-linear device (e.g., KTP crystal) used for frequency doubling has non-linear behavior such that the output power at the second harmonic increases with the square of the input power at the fundamental frequency, or $$P_2 = kP_1^2$$

Where $P_2$ = Power at second harmonic (532 nm)
$P_1$ = Power at fundamental (1064 nm)
$k$ = constant of proportionality.

This is described in several standard text books such as *The Principles of Non-Linear Optics* by Y. R. Shen, John Wiley & Sons, 1984, p. 86. The above equation is correct as long as the total conversion from fundamental to second harmonic remains small, typically less than 20 to 30%. The significance of the non-linear behavior becomes very important when the fundamental power is being pulsed. Consider the simple example where the fundamental power is pulsed at a 50% duty cycle and the average fundamental power remains the same. For the 50% of the time that the fundamental power is turned on, the peak power is near twice the average to maintain a constant average power. The second harmonic generation increases to four times the power that it would be with a constant fundamental input power, and for the 50% duty cycle, the average second harmonic power is increased by a factor of two. For a 20% duty cycle, the increase in average second harmonic power is 5 times over a constant pump power at the same average power. This property of second harmonic generation becomes very significant when the laser is being pulsed.

The laser beam output characteristics are an important consideration in designing an intracavity NLO laser. Not only is high power desirable, but also the laser output beam spot size and cone angle, to a large degree, determine the applicability of the laser system. Specifically, many applications require the output beam to be coupled to a fiber optic delivery system. Therefore, the characteristics of the fiber optic used drive the output beam spot size (diameter) and cone angle (full divergence angle) requirements of the laser resonator.

Typical fiber optic numerical apertures range from 0.22 to 0.44 for fiber optic delivery systems. Generally, glass clad silica fibers have a numerical aperture of near 0.22, while plastic clad silica fibers have a larger numerical aperture of near 0.44. However, the plastic clad silica fiber is not used with high power beams or small diameter fibers because of possible fire, melting, or deformation of the plastic brought on by higher fiber laser power, particularly at the input and output faces. For certain applications, a typical high power output beam in surgical systems must be capable of delivery into a 100μ glass clad silica fiber with a numerical aperture of 0.22.

It is well known in the art, that a laser beam's diameter and divergence angle are a function of the resonator design. More particularly, one can define a term called the mode multiplier M. This is defined as:

$$M = \frac{\text{Diameter of Multimode Beam}}{\text{Radius of } TEM_\infty \text{ Beam}}$$

For gaussian beams, this ratio is constant anywhere inside and outside the resonator, as long as the laser beam encounters no other distortions such as lens aberrations.

For a $TEM_{oo}$ beam, when the laser beam is focussed to a beam waist with radius $W_o$, the half angle divergence of the beam is $\theta_o = \lambda/\pi W_o$, and hence, the product of the beam waist radius $W_o$ and divergence $\theta_o$ is a constant given by:

$$\theta_o W_o = \frac{\lambda}{\pi}$$

Where
λ=wavelength of the beam
$\theta_o$=half-angle divergence of the beam in radians
$W_o$=beam radius at $(1/e)^2$ of the peak intensity of the gaussian beam profile Therefore, for a $TEM_{oo}$ beam, the product of the spot size and divergence of the beam is only a function of the wavelength.

For a multimode beam, from the definition of the mode multiplier M, it follows that the multimode beam diameter at a beam waist is $d_{mm}=M\,W_o$. The half angle divergence of the multimode beam is $\theta_{mm}$, and again from the definition of M, $\theta_{mm}(d_{mm}/2W_o)\,\theta_o$ or $\theta_{mm}=M\,\theta_o/2$. It now follows that the product of the beam diameter and the half angle divergence is given by:

$$\theta_{mm} d_{mm} = \frac{M^2 \lambda}{2\pi}$$

Where
$\theta_{mm}$=half angle divergence of the multi-mode laser beam in radians
$d_{mm}$=waist diameter of the multi-mode laser beam
M=mode multiplier, as defined above In any laser, there is a hard aperture that limits the maximum diameter of the laser beam inside the resonator. For solid state lasers, this is usually the aperture of the laser rod. For highly multimode lasers, the multimode beam diameter is nearly equal to the laser aperture, and it is a reasonable assumption that for a multimode beam diameter of about 90% of the laser aperture, the beam passes through this aperture with negligible loss. One skilled in the art can calculate the $TEM_{oo}$ mode radius for a particular resonator configuration, and from the assumption that the multimode diameter is 90% of the laser aperture, can then calculate the mode multiplier M. One can then further calculate M over the range of stability of a particular resonator and find the range of values of M where the resonator is stable as a function of thermal focussing.

For a $TEM_{oo}$ beam, the transmission through an aperture is 99% when the aperture diameter is about 3 times the $TEM_{oo}$ mode radius. It follows that for a $TEM_{oo}$ beam, $M \approx 3$ when M is calculated as described above.

One generally finds that as the resonator design is changed to make it stable for a wider range of thermal focussing, the value for M generally increases and the output beam becomes less focussable.

The significance of knowing M for a particular resonator configuration is that together with the wavelength, one can calculate the $\theta_{mm} \cdot d_{mm}$, the product of the beam divergence and the beam diameter. To focus the beam to a particular spot size, it then follows what the beam divergence will be to focus the beam to this spot, and this, for example, will determine whether a particular beam can be focussed into a fiber, and what the f-number of the lens will be that is required to focus this beam.

For example, if a laser beam at 532 nm is coupled into a 100μ fiber with a numerical aperture of 0.22, a half-cone angle of 12.7 degrees or 0.22 radians would be required. To allow for tolerances, typically 85% of these values would be used, or an 85μ spot and a 0.19 radians angle. These coupling requirements would require a mode multiplier less than 9.8.

Control of the mode multiplier of the laser is obtained by positioning the mirrors of the laser resonator until the beam can be focussed into the 100μ fiber. However, this also makes the resonator more susceptible to effects of thermal focussing and lowers the pump power where the output of the laser folds back as described above. This limits the usable output power and clearly demonstrates how thermal focussing limits the output of the laser. While power output is also limited when coupling a fundamental wavelength beam into a fiber, one generally finds that the output power of the second harmonic is even more susceptible to thermal focussing with these fiber coupling requirements.

As can be seen from the above discussion, it is desirable to provide an intracavity NLO laser system capable of producing high average power for extended periods of time within practical output beam spot size and cone angle parameters.

SUMMARY OF THE INVENTION

The present invention discloses an intracavity non-linear laser with unexpectedly high average output power and conversion efficiency by reducing the effect of thermal focussing per unit pump energy. The unexpectedly high average output powers and conversion efficiencies are substantially higher than any intracavity non-linear laser found in the prior art. The intracavity non-linear laser comprises a laser resonator which resonates at a first frequency. The laser resonator includes a first gain medium characterized by thermal focussing and a first source of pump energy. The first source of pump energy is coupled with the first gain medium providing a gain at a first frequency in response to the pump energy. A Q-switch is also mounted within the laser resonator. Means are provided for reducing effects of thermal focussing on resonator stability per unit of pump energy delivered to the gain medium. Finally, means for extracting an output beam at a second frequency is provided.

In one aspect of the invention, the means for reducing effects of thermal focussing on resonator stability per unit of pump energy delivered to the first gain medium is a first closely coupled diffuse reflector.

In a traditional YAG laser design, an elliptical reflector is used to focus the pump light and usually focusses more pump light in the center of the rod. This increases the thermal focussing. With a diffuse reflector, the pump power is more evenly distributed in the rod and this reduces the thermal focussing somewhat, and improves the quality of the output beam.

In another aspect, the means for reducing effects of thermal focussing on resonator stability per unit of pump energy delivered to the first gain medium is a second gain medium characterized by thermal focussing mounted within the laser resonator coupled with a second source of pump energy. Both media contribute to power of the output beam while with proper spacing of the two gain media, only the effect of thermal focussing in the first gain medium effects resonator stability.

In another aspect, the means for reducing the effects of thermal focussing on resonator stability per unit of pump energy delivered to the first gain medium comprises N gain media. Each gain medium is positioned such that all N gain media only contribute to the effective thermal focussing of approximately one gain media, but has the effective gain of N gain media.

In industrial lasers, multiple YAG rods with over one kilowatt of average power are available. However, multiple rod configurations have not been introduced into intracavity NLO lasers. When using multiple rods in the laser resonator, it is possible to space the rods such that the beam between the rods focusses to a beam waist and then expands again before reaching the next rod. These rods thus periodically focus the beam. Given a particular thermal focal length of the rods, the rods can be spaced such that the overall focussing effect is that of only one rod, but the laser gain and hence effective pump power is N time that of a single rod, where N is the number of rods. Theoretically, it should be possible for N rods in the laser, to increase the output power by N for the same beam quality.

In another aspect, the means for reducing the effects of thermal focussing on resonator stability per unit of pump energy delivered to the first gain media is a filter between the source of pump energy and the first gain medium. The short wavelengths of pump energy are prevented form being absorbed by the first gain medium while allowing longer wavelengths of pump energy to be absorbed by the first gain medium.

In another aspect, the means for reducing the effects of thermal focussing on resonator stability per unit of pump energy delivered to the first gain medium is a filter between the source of pump energy and the first gain medium. The filter absorbs short wavelengths of pump energy and fluoresces some of the pump energy in the long wavelength pump band of the first gain medium while allowing long wavelengths energy from the pump source to be transmitted by the filter and absorbed by the first gain medium.

In another aspect, the means for reducing effects of thermal focussing on resonator stability per unit of pump energy delivered to the first gain medium is a semiconductor diode laser.

It is also well known that different pump sources cause more or less thermal focussing in solid state lasers. In particular, pumping a solid state laser with another laser source generally reduces the heating in the laser rod and can be used to improve the output with non-linear output coupling, such as second harmonic generation. In particular, the use of AlGaAs diode lasers to pump the Nd:YAG will reduce thermal focussing and increase the second harmonic output.

In another aspect, means for coupling the output beam of the laser resonator into a fiber optic delivery system is provided.

Moreover, any technique that lowers the thermal focussing for a given amount of pump power will substantially increase the output power from the laser in the fundamental wavelength, and even more in the second harmonic.

Other aspects and advantages of the present invention will be seen upon review of the figures, the detailed description, and the claims which follow.

DETAILED DESCRIPTION OF THE INVENTION

Figure 1:
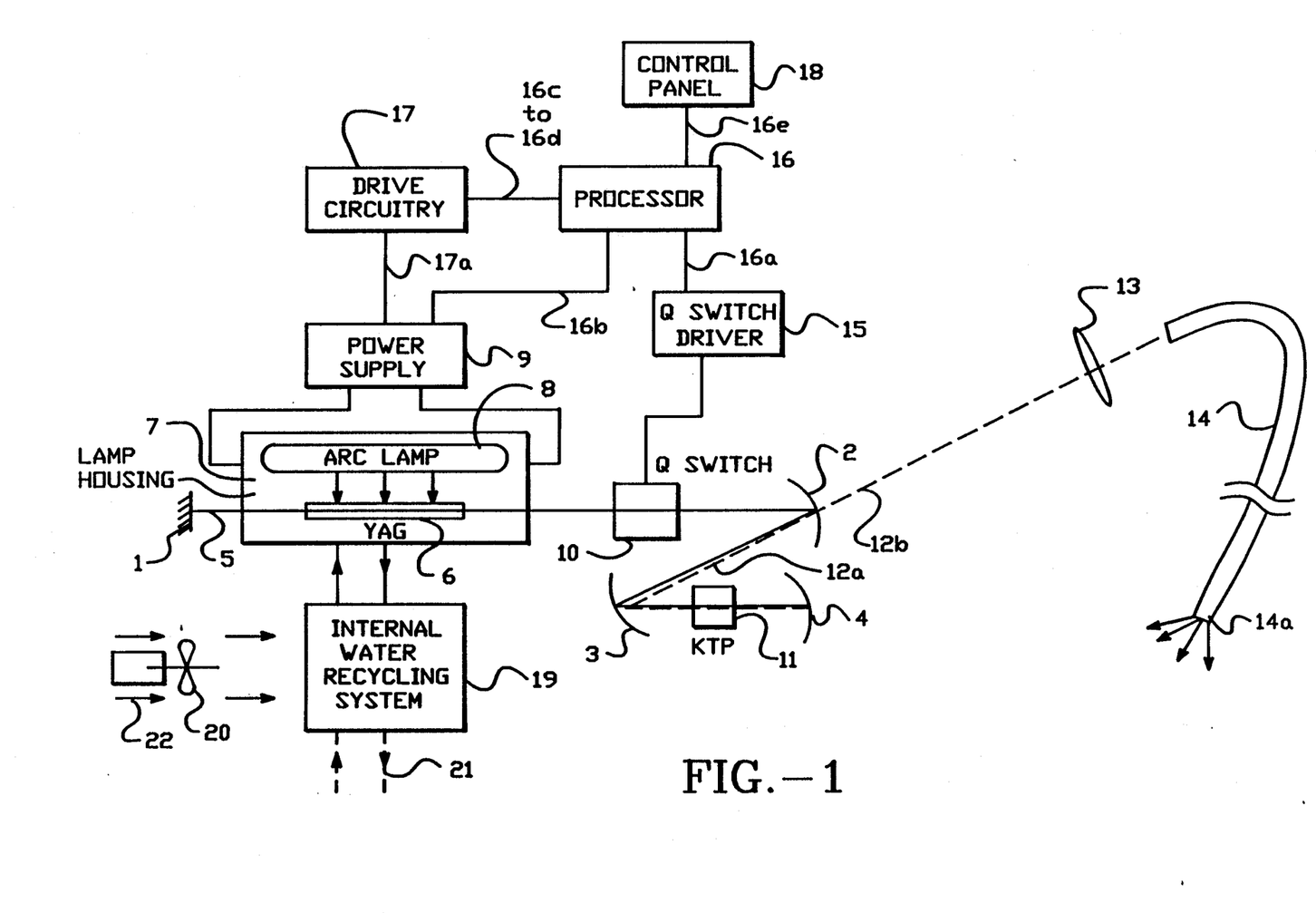
FIG. 1 is a block diagram of a surgical laser system employing the present high powered intracavity NLO laser invention.

Preferred embodiments of the present invention are described with reference to the figures. FIG. 1 shows a block diagram of a surgical laser system which employs the present intracavity NLO resonator. In FIG. 1, the laser resonator is defined by end mirror 1, turning mirrors 2 and 3, and end mirror 4. All of these mirrors are high reflecting (greater than 99.8% typically) at the 1064 nm line. An optical path 5 is defined by these mirrors. A gain medium 6 comprising an Nd:YAG rod is mounted along the optical path within lamp housing 7. Arc lamp 8 is also mounted within lamp housing 7. The arc lamp 8 supplies pump power to the Nd:YAG rod 6 in response to current generated in power supply 9. Also in the optical path 5 is a Q-switch 10 between the lamp housing 7 and the turning mirror 2. A non-linear crystal 11 is mounted between the turning mirror 3 and the back mirror 4. This non-linear crystal is preferably a KTP crystal properly cut and aligned for frequency doubling to generate a 532 nm beam. Mirrors 4 and 3 are highly reflective at 532 nm, while mirror 2 is transmissive and operates as an output coupler for the 532 nm beam.

The output beam along path 12b is then directed to lens 13. Alternate embodiments of FIG. 1 may include an external attenuator, beam splitter, exposure shutter, calibration shutter, and safety shutter along beam path 12b. However, for clarity in this invention, these devices have been omitted from the figure. Lens 13 then focusses the beam along optical path 12b into fiber optic 14 to the distal end 14a of the fiber where it may be supplied to a surgical instrument or used directly for biomedical effects.

The control of the mode multiplier M of the laser is obtained by moving the end mirror 1 further away from the Nd:YAG rod 6 until the beam along optical path 12b can be focussed into fiber optic 14.

The Q-switch 10 is controlled by Q-switch driver 15, which is, in turn, coupled to data processor 16 across line 16a. In the preferred system, the Q-switch is an acousto-optic Q-switch and operated at 25 kHz.

Similarly, the power supply 9 generates an electrical power signal for controlling the arc lamp 8. This power signal is controlled by the data processor 16 across line 16b and by drive circuitry 17 across line 17a. Drive circuitry 17a is controlled by the data processor 16 across lines 16c through 16d. Finally, a control panel 18, by which a user can supply input signals and parameters, is provided. This control panel 18 is connected to the data processor 16 across line 16e.

In alternative systems, the non-linear crystal may be mounted for extracting outputs other than the second or $N^{th}$ harmonic, such as sum-of-frequency derivation or the like.

In one preferred system, the data processor 16 consists of an Intel 80186 microprocessor mounted on a main control PC board in the laser system, including various peripheral circuits, such as analog-to-digital converters (A DC), drive circuits, memory devices, and other peripherals, as known in the art, to form a data processing system which operates under program control.

The program controlled data processor 6 in turn generates control signals for controlling the drive circuitry 7 and power supply 9 to specify pumping modes of the laser system. Also, the program controlled data processor 6 controls the Q-switch 10 and the components in the beam path outside the laser resonator.

The pump power source is a krypton arc lamp, 3" long, with an internal diameter of 6 mm. The lamp is available from Q-Arc Co. of Cambridge, England. The arc lamp 8 is powered by power supply 9, such as a YAG DRIVE Trademark 6 kW arc lamp power supply manufactured by A.L.E. Systems, Inc. of Massachusetts. This power supply is particularly suited to the krypton arc lamps referred to above.

Of course, alternative pump power sources, such as laser diode arrays, lasers for longitudinal pumping and others, can be used as suits the needs of a particular gain medium and application of the laser system.

The lamp housing 7 in the embodiment of FIG. 1 includes passages for flowing cooling water in contact with the Nd:YAG rod 6 and the arc lamp 8 for cooling of these components. Water could be supplied by an internal water recycling system 19, which includes a radiator fan 20 which drives air (schematically block 22) over the radiator to dissipate a limited amount of heat into the air surround the laser system. Heat may be dissipated from approximately 600 W to 2.54 kW during various modes of operation. However, the average amount of dissipated heat is less than the amount determined by the capabilities of the cooling system. As an alternative, as indicated by the lines 21, an external water cooling can be used for dissipating large quantities of heat.

Figure 2A:
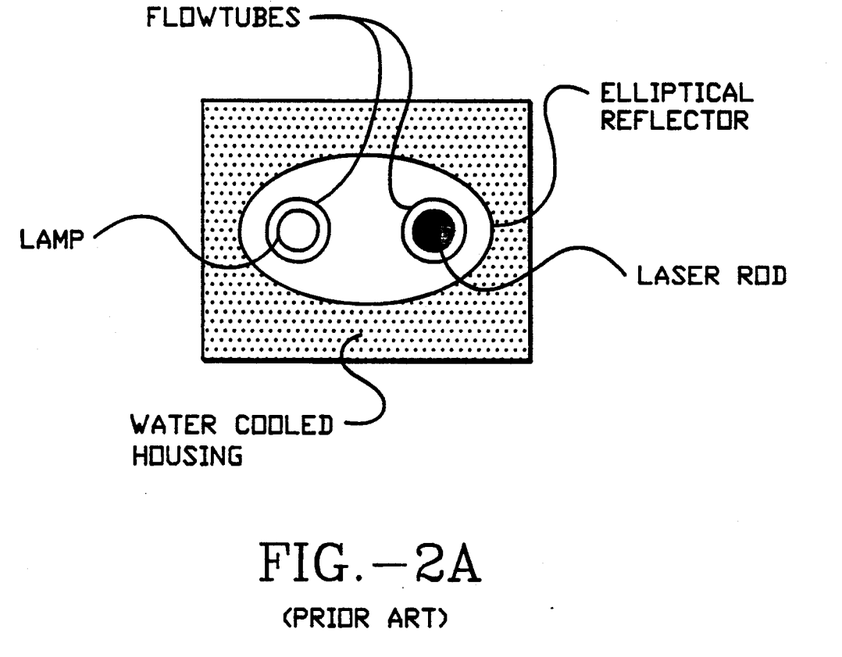
FIG. 2a is a cross-sectional view of a prior art lamp/rod elliptical reflector housing unit.

FIG. 2a is a cross-sectional view of a typical prior art lamp/rod housing configuration. In the prior art, a single ellipse reflector, as shown in the figure, or double ellipse reflector was used in conjunction with the lamp in order to focus energy into the center of the laser rod. Flow tubes are used around the rod and lamp for efficient cooling.

Figure 2B:
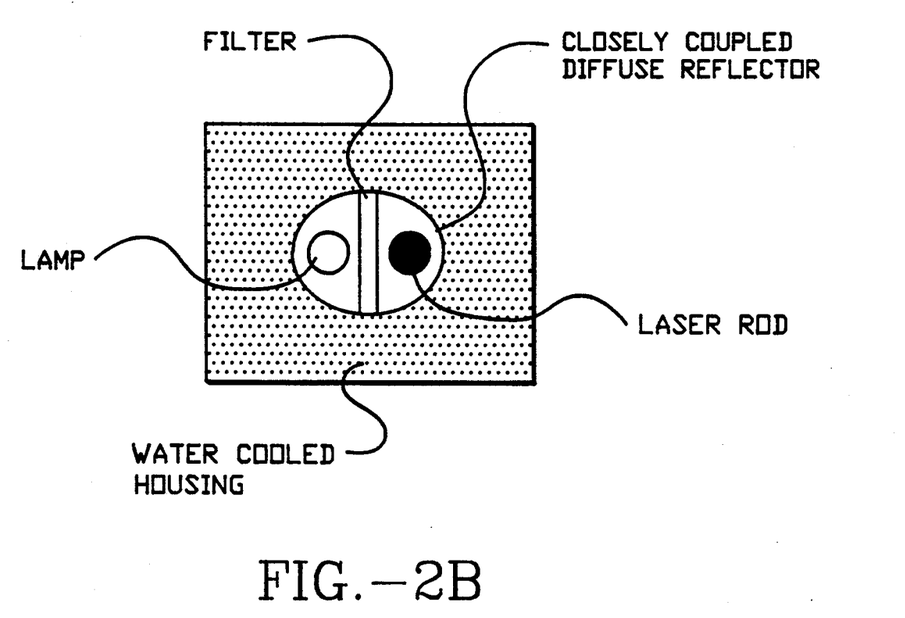
FIG. 2b is a cross-sectional view of the closely coupled diffuse reflector used in the resonator of the present invention.

FIG. 2b is a cross-sectional view of the present invention's lamp/rod housing configuration. A single ellipse reflector or double ellipse reflector is not used. Instead, a closely coupled diffuse reflector is incorporated coated with a 99.9% concentration of alumina which is effective in reducing the amount of thermal focussing in the rod, per unit of pump energy supplied by the lamp to the rod. Also, the reflector is usually coupled close enough to the rod and lamp such that flow tubes are not required around these components for efficient cooling. Only a thin glass slide is placed between the rod and lamp to define the water flow channels. To reduce thermal focussing, this glass slide can be a filter to absorb the shorter wavelength pump bands as described later. This new structure allows the laser medium to be pumped with a more uniform distribution of pump energy. Moreover, the uniform pumping has substantially reduced the adverse thermal effects and unstable thermal focussing associated with the previous prior art lamp/rod housing units. The new housing configuration enables pumping at pump energies beyond the "foldback point" and into the "foldback region" of the prior art systems, thus allowing unexpected increases in power, output power and substantially greater conversion efficiency.

Figure 3:
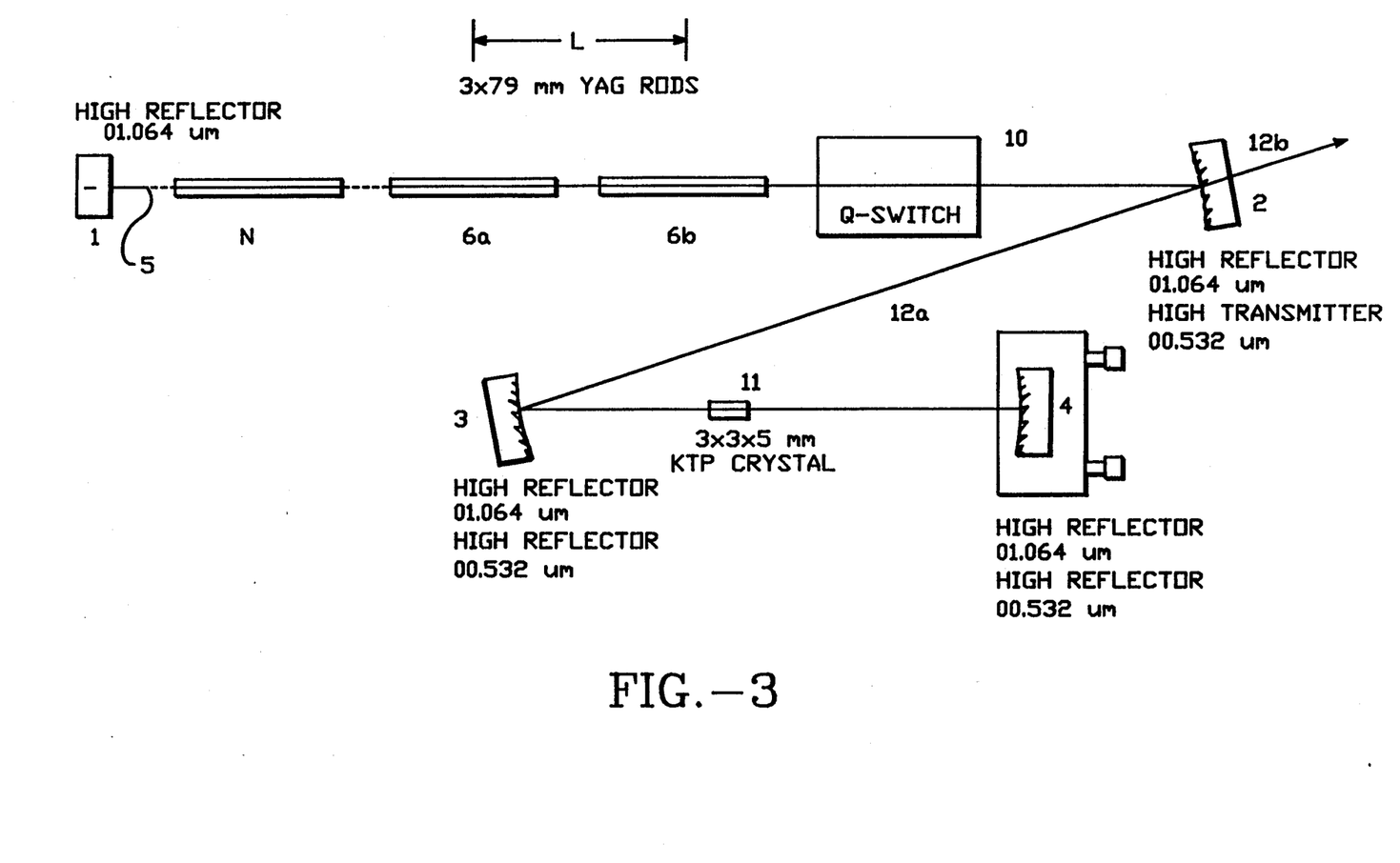
FIG. 3 is a diagram of the present intracavity NLO resonator configuration employing multiple YAG rods.

FIG. 3 is a schematic drawing of a resonator configuration using plural gain media in series for high NLO conversion efficiencies and high output power. This resonator configuration is a modification of a design described in detail in the Kuizenga patent (U.S. Pat. No. 4,907,235) referred to above.

The laser resonator is designed for resonating at a first frequency, i.e., 1064 nm along the Z-shaped optic path 5. A second frequency derived from the 1064 nm beam is generated in the KTP crystal 11. This beam travels along the path 12a and is extracted from the resonator to supply an output beam along path 12b.

In the preferred system, the mirror 2 has a radius of curvature of 50 cm and mirror 3 has a radius of curvature of 20 cm to provide a 2.5 magnification relay of the beam at the output of the Nd:YAG rod 6b to the KTP crystal 11. The criticality of this relationship is described in detail in the above-referenced Kuizenga patent. In the preferred embodiment, the concentration of Neodymium in the YAG rods is 1.1%±0.1%. The Nd:YAG rods 6a and 6b are 79 mm long and 5 mm in diameter. In a preferred system, each is mounted in a lamp housing (not shown) like lamp housing 7 of FIGS. 1 and 3. Placement and spacing L of Nd:YAG rod 6a and 6b is such that thermal focussing created by Nd:YAG rod 6a does not limit the stability of the resonator, while at the same time Nd:YAG rod 6a contributes to the increase in power. This multiple rod configuration allows each rod in the resonator to contribute to the power output; yet, the stability of the resonator is limited by the thermal focussing of the final rod, Nd:YAG rod 6b of FIG. 3. Thus, the second rod, and any additional rods N in series, result in greater cavity stability by reducing the effects of thermal focussing per unit of pump energy delivered to the gain media as a whole.

A suitable placement of the rods for very high average power in a 2-rod design of FIG. 2 has been found to be 155 mm from near mirror 1 to the center of Nd:YAG rod 6a and 398 mm from near mirror 1 to the center of Nd:YAG rod 6b. Each is mounted in a closely coupled diffuse reflector in preferred configuration.

The KTP crystal 11 is 3 mm by 3 mm square and 5 mm long. Mirror 1 is a flat mirror, and mirror 4 has a radius of curvature of 10 cm. In addition, for a particular laser resonator design, mirrors 1 and 4 will also determine the range of thermal focussing within which the resonator will be stable.

Figure 4A:
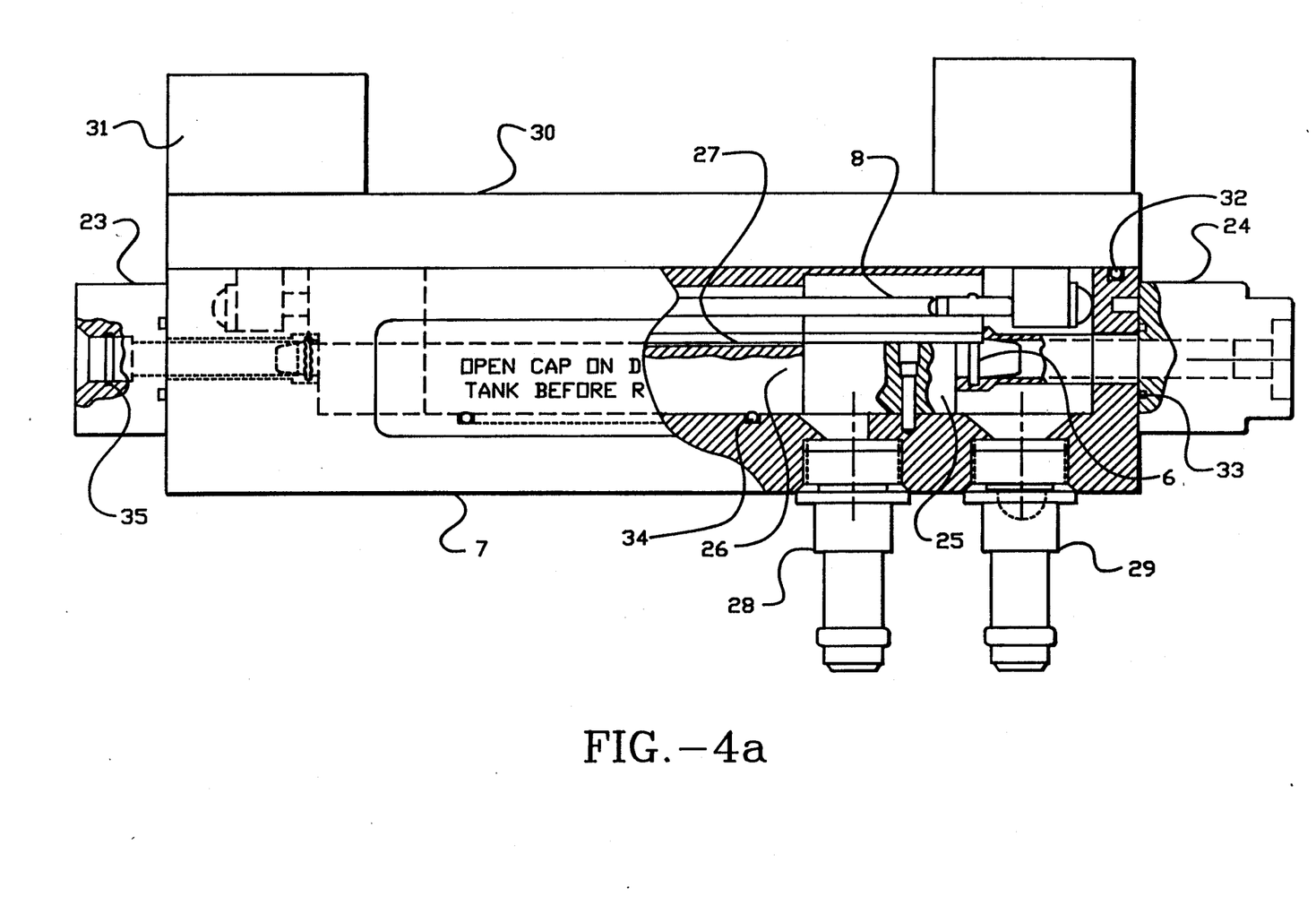
FIGS. 4a and 4b are assembly drawings of the present arc lamp YAG rod housing unit.

FIG. 4a is a horizontal side assembly drawing of the lamp housing 7 of the resonator of FIG. 1. YAG rod position holders 23 and 24 are placed at the ends of lamp housing 7. YAG rod position holder 23 is placed on the near mirror 1 in FIG. 1. Nd:YAG rod 6 is positioned by Nd:YAG holders 23 and 24 and Nd:YAG frame 25. Krypton arc lamp 8 is positioned as close to YAG rod 6 as possible. Diffuse reflector bottom 26 is closely fitted around Nd:YAG rod 6. A corresponding diffuse reflector top is placed above the lamp (not shown in drawing). Lamp housing filter 27 is placed between Nd:YAG rod 6 and diffuse reflector bottom 26. Lamp housing filter 27 has two functions. First, it separates the water cooling flow from the arc lamp 8; and second, lamp housing filter 27 prevents unwanted energy, such as ultra-violet radiation, from being introduced into Nd:YAG rod 6 by arc lamp 8.

Figure 8:
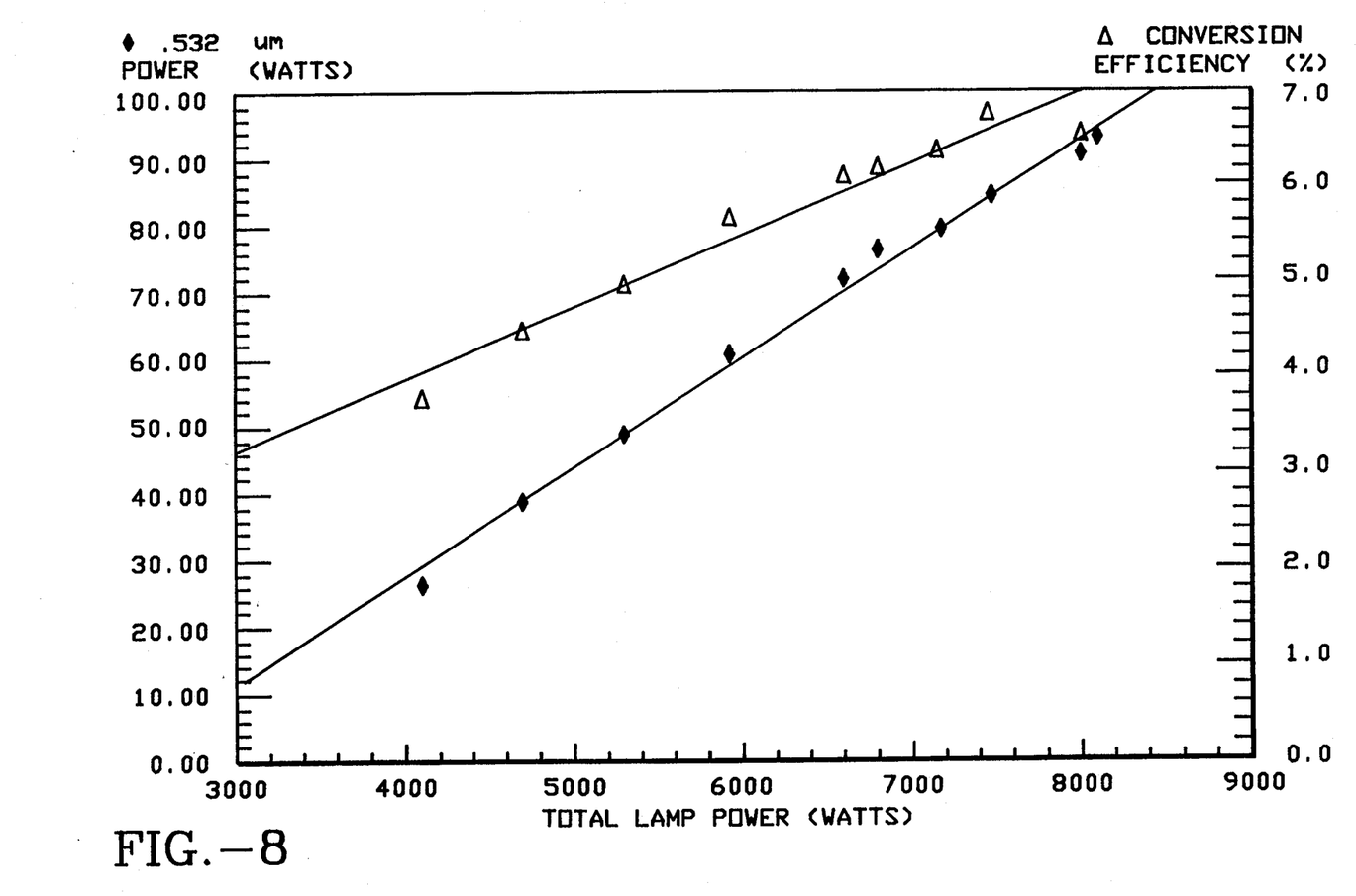
FIG. 8 shows the 532 nm optic conversion efficiency and power output as a function of total electrical input power to two pump cavities in the present invention.

Filter 27 is used to prevent light at shorter wavelengths from being introduced into Nd:YAG rod 6. These shorter wavelengths of light may pump the Nd:YAG rod 6 but proportionally adds more heat to the Nd:YAG rod 6. By using filter 27 to cut-off this pump light, the YAG rod can be pumped harder before the effects of thermal focussing are observed. A yellow slide from Shott, filter number OG530 cutting off all light above 530 nm has improved the laser output, and a red slide from Shott, filter number RG695 cutting off all light above 695 nm has improved the laser output even further. The relationship between various filters and power output is shown in FIG. 8.

In an alternative embodiment, filter 27 may be used to absorb the shorter wavelengths and re-radiate some of the energy by fluorescence at a longer wavelength into the Nd:YAG pump bands. Alexandrite filter may be used for this embodiment.

Connectors 28 and 29 are used for the water cooling system. Cooling water enters lamp housing 7 through the water cooling inlet connector 28. The water then exits through the water cooling outlet connector 29.

Lamp housing 7 is covered with lamp housing cover 30. The lamp line insulator connector 31 is positioned on top of lamp housing 7. O-rings 32–34 and 35 are of various dimensions and are also shown.

Figure 4B:
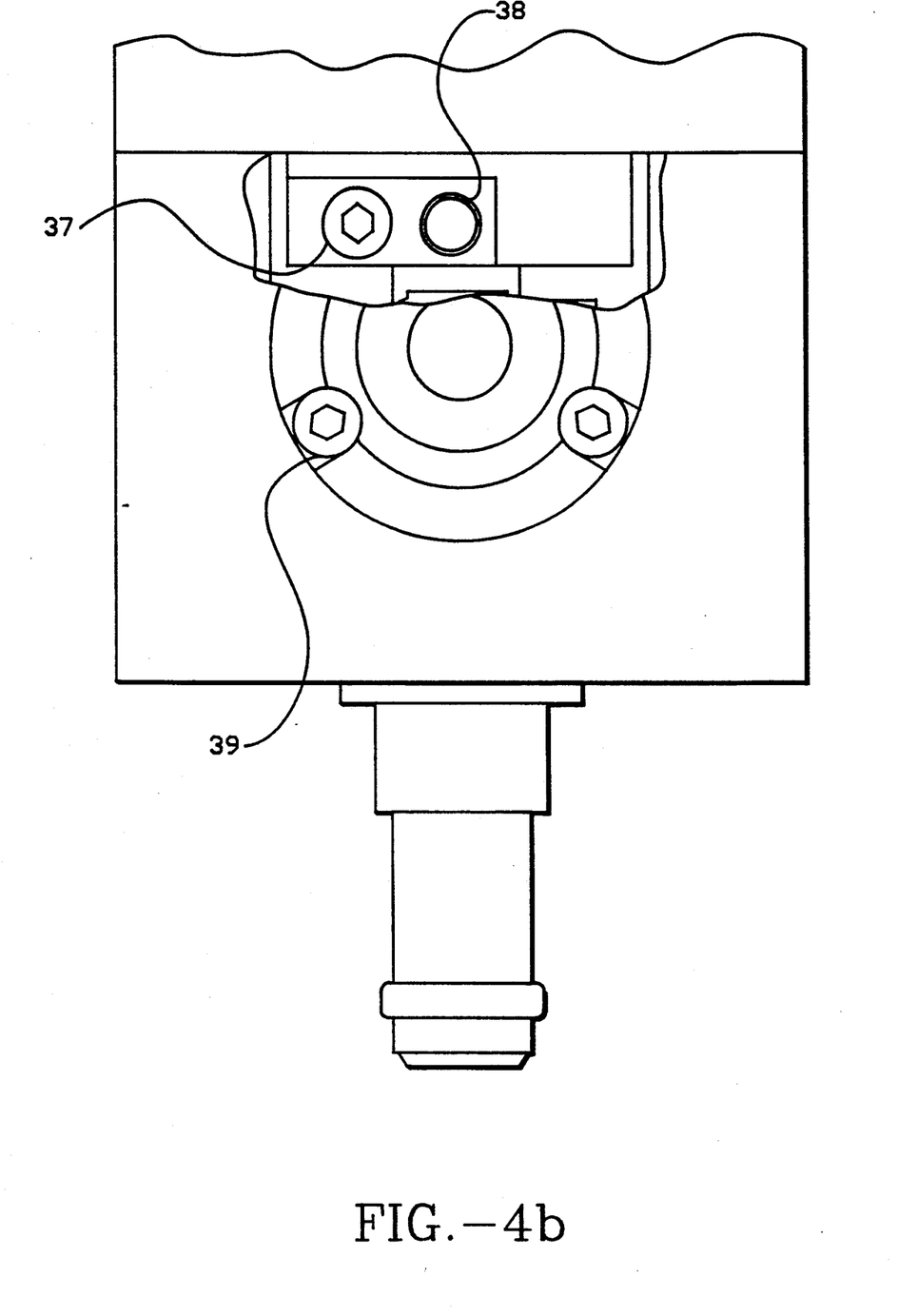
Figure 5:
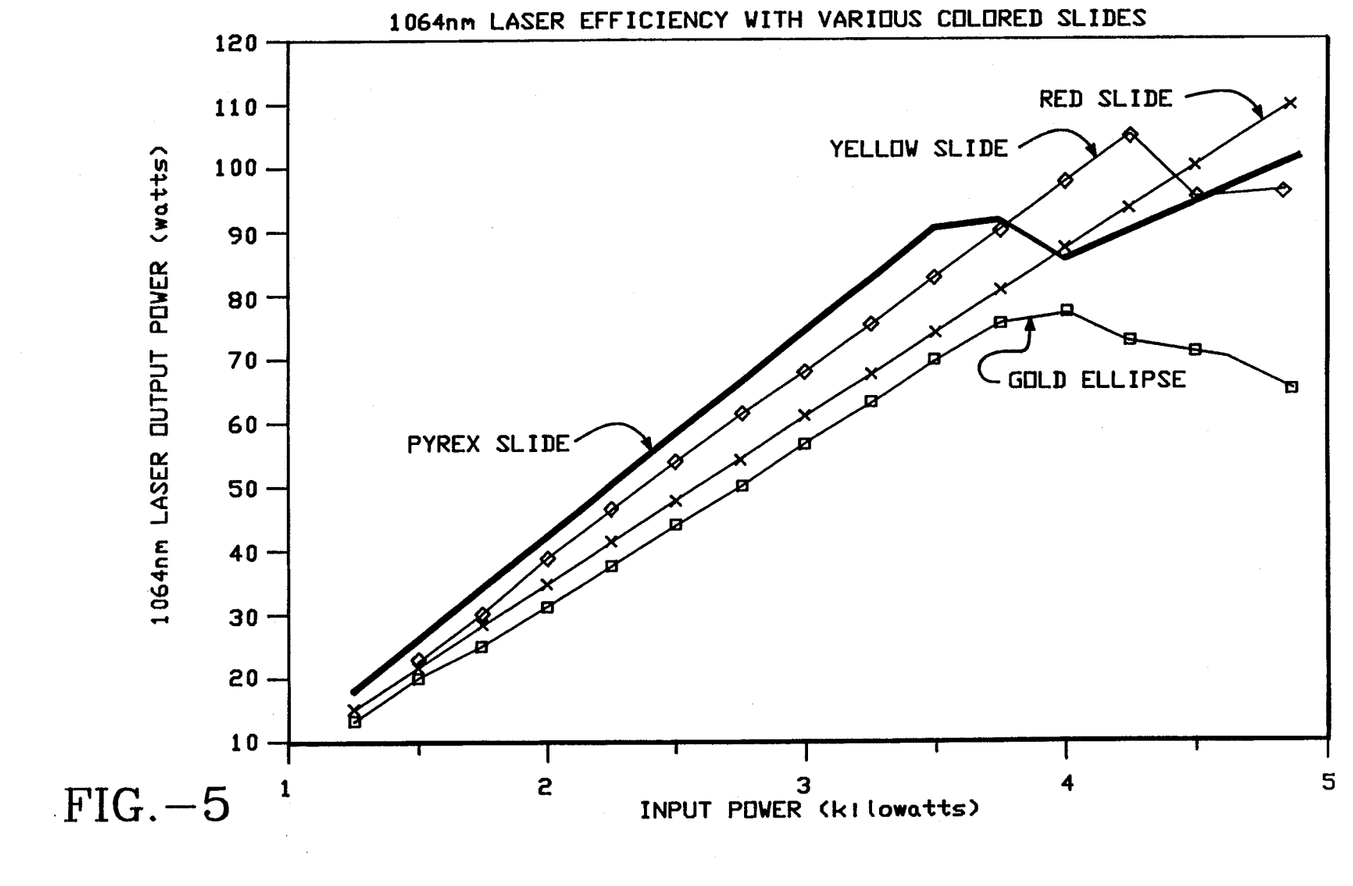
FIG. 5 shows the 1064 nm power output as a function of power input with various colored slides filtering the pump energy from an arc lamp in the present invention. Similar characteristics are obtained for 532 nm output.

FIG. 4b represents an end assembly drawing of the lamp housing 7. Lamp mount connector 36 and screw 37 are used to secure the arc lamp 8. Band contact 38 is also shown. Finally, 2 of the 3 screws 39 which hold the end cover to the housing 7 are shown.

Figure 6:
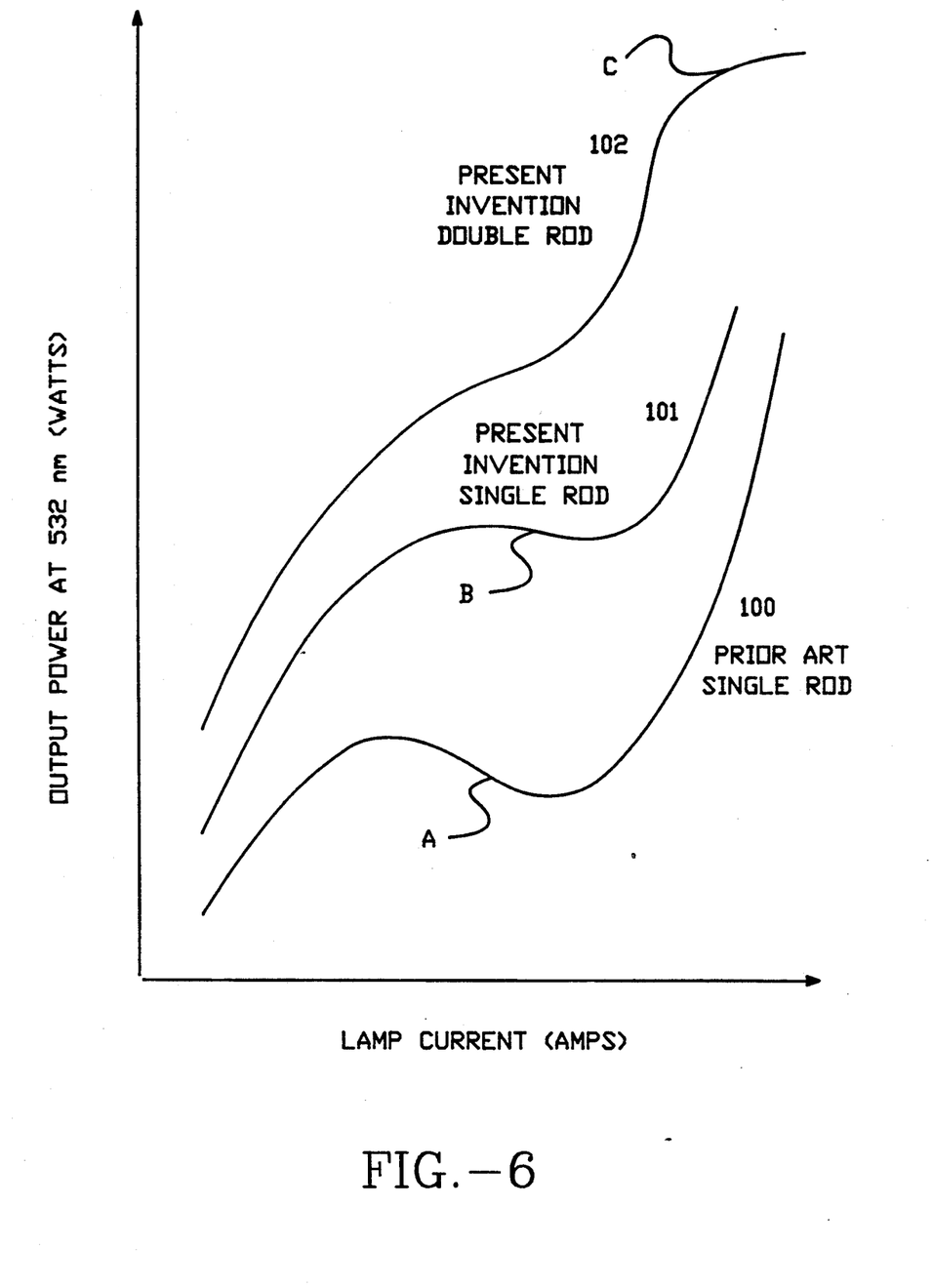
FIG. 6 shows heuristically the average output power for a Q-switched frequency doubled Nd:YAG laser at 532 nm as a function of average arc lamp current.

FIG. 6 illustrates the intracavity NLO 532 nm output power curves as a function of lamp current. These curves are based on a cooling water temperature of 95° to 105° F. In addition, typically 15% of the output power shown in the curves is lost when using a fiber optic delivery system. Curve 100 represents a power output curve the prior art resonator of the style described in the Kuizenga patent (4,907,235) utilizing a 4 mm×79 mm Nd:YAG rod in an elliptical reflector lamp housing. Lamp current to power output is linear until reaching the "foldback point," seen as A in FIG. 6. In the prior art, the "foldback point" occurred at approximately 32 A of lamp current (which is representative of energy delivered to the gain medium) producing 26 W of 532 nm output power. After reaching "foldback point" A, power output would decrease slightly with increased lamp current. Furthermore, in this "foldback region," power output pulses would become unstable. While power output would eventually increase proportionately with lamp current, previous intracavity NLO laser systems did not utilize this portion of the power curve because of the instability of the pulses, and other power limiting factors.

Similar power curve characteristics occur with a red 659 nm output. The "foldback point" for a typical prior art 659 nm configuration occurred at approximately 30 A producing 5.5 W of output power.

Power curve 101 represents the 532 nm power output of the present invention which incorporates the closely coupled diffuse reflector and a 5 mm×79 mm Nd:YAG rod. The "foldback point" in the present invention, shown as B in FIG. 6, has been moved up and out. Particularly, the "foldback point" in the present invention occurs at a higher lamp current and at a higher output power. The "foldback point" B in the single rod/diffuse reflector embodiment of the present invention occurs at approximately 33 A producing 50 W of 532 nm output power. While power output is still unstable beyond "foldback point" B, the present invention is operating well into the "foldback region" of the prior art system. The present invention is producing 50 w of 532 nm output power in an area of the prior art power curve that previously was unusable because of unstable output.

Similar power curve characteristics occur with a red 659 nm output incorporating the present invention. The "foldback point" for the 659 nm output occurs at approximately 39 A producing 10.2 W of output power. As can be seen from FIG. 6, relatively small increases in lamp current in the present invention has resulted in a doubling of output power for both the 532 nm and 659 nm configurations.

Power curve 102 represents the present invention with a double rod design. The "foldback point" C of the double rod design occurs at 97 W, almost a fourfold increase over the prior art system. In addition, the 97 W is almost a three-fold increase over any 532 nm output power reported.

The 97 W was produced by 18.45 kHz Q-switch with 1.7 $\mu$s gate. Moreover, total current input to the two lamps was approximately 74 A, with 43 A driving the Nd:YAG rod 6a lamp and 31 A driving the Nd:YAG rod 6b lamp. Similarly, 23 W of 659 nm output was produced by the 2-rod configuration. The Q-switch was operated at 4.1 kHz with a 11.7 $\mu$s gate. Approximately, 70 A drove the two lamps, 40 A drove the Nd:YAG rod 6a lamp and 30 A drove the Nd:YAG rod 6b lamp.

Figure 7A:
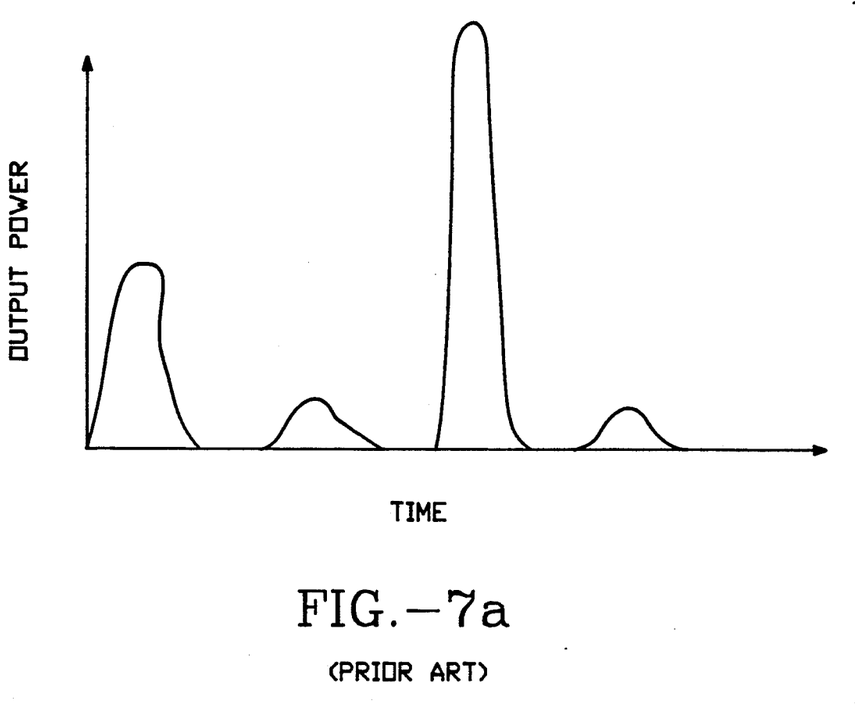
FIG. 7a shows heuristically power output pulses of a Q-switched frequency doubled Nd:YAG laser at 532 nm beyond the "foldback point" found in the prior art.
Figure 7B:
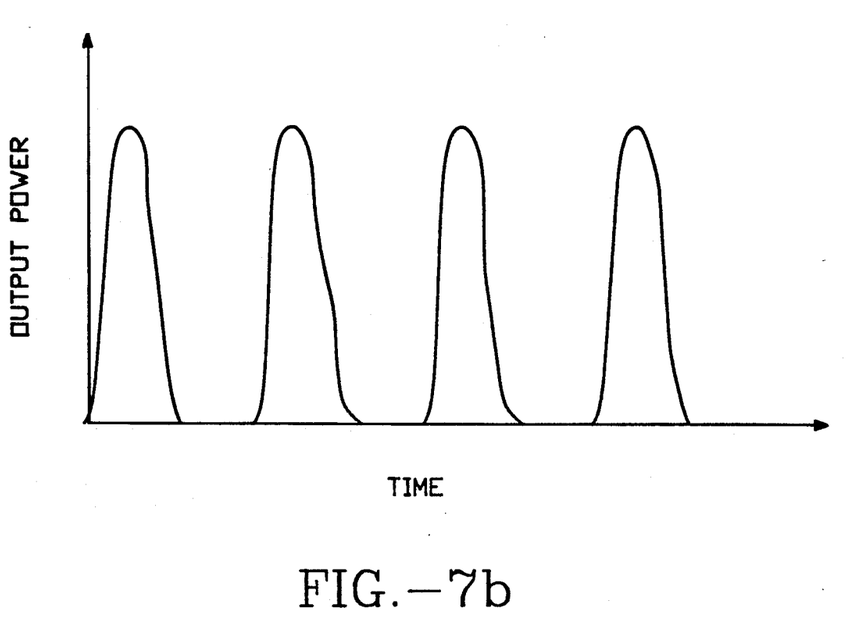
FIG. 7b shows heuristically power output pulses of a Q-switched frequency doubled Nd:YAG laser beyond the prior art "foldback point" in the present invention.

FIGS. 7a and 7b represent the power of output pulses as a function of time in the "foldback region" of the prior art and the present invention, respectively. As can be seen in FIG. 7a, power output in and beyond the "foldback region" in the prior art is non-uniform. In the prior art, a constant power output pulse waveform was not achievable in or beyond the "foldback region." However, in the present invention, the power output pulse waveform is uniform in the prior art "foldback region." This stable waveform obtained in the prior art "foldback region" now enables higher power outputs. The present invention has taken advantage of the now available power curve area, and thus, is able to increase power output dramatically over prior art systems.

FIG. 8 represents the increases in power output and conversion efficiency of the present 2-rod resonator design as shown in the 2-rod configuration of FIG. 3. 97 W of average power has been generated by a 2-rod Nd:YAG NLO laser using a KTP crystal to output 532 nm. In one embodiment for optimizing power with Q-switching parameters, the Q-switch frequency for the 532 nm output is 18.45 kHz with a gate of 0.7 $\mu$s. The present invention has not experienced substantial degradation in power efficiency as in the prior art. High power conversion efficiency was observed for over 48 hours of continuous use.

In an embodiment maximizing 659 nm power output, 23 W is produced with Q-switching frequency of 4.1 kHz and a gate of 11.7 μs. Conversion efficiencies of 1.2% and 0.3% (second harmonic power versus lamp input power) have been achieved by the 1064 nm and 1318 nm doubling, respectively. Also, optical conversion efficiencies (internal fundamental power to external second harmonic generation output power) of 7.8% and 2.3% were recorded for 1064 nm and 1318 nm doubling, respectively. The powers at both 532 nm and 659 nm have shown no saturation effects and the KTP crystals used in both cases have shown no signs of damage.

The average internal fundamental power at the KTP crystal is substantially higher than what has been achieved in the prior art. Using the above optical conversion efficiencies, 7.8% and 2.3%, for 1064 nm and 1318 nm doubling and average output powers of 97 W and 23 W, the internal fundamental power at the KTP crystal is approximately 1.2 KW and 1.0 KW, respectively.

The preferred system is adapted particularly to laser surgery by generating a second harmonic of a 1064 nm line or 1318 nm line from an Nd:YAG laser using a non-linear crystal comprised of KTP.

The present invention can also be applied to a much larger class of applications, including photodynamic therapy, dermatology and other medical uses. Also, the laser can be used in industrial applications which may have a need for beams extracted from a laser resonator using non-linear crystals for frequency doubling, or which may benefit from the laser system characterization techniques of the present invention.

The foregoing description of the preferred embodiments of the present invention have been provided for the purpose of illustration and description. It is not intended to be exhaustive or to limit the invention to the precise form disclosed. Obviously, many modifications and variations will be apparent to the practitioners skilled in the art. The embodiments were chosen and described in order to best explain the principles of the invention and its practical applications, thereby enabling others skilled in the art to understand the invention for various embodiments and with various modifications as are suited to the particular use contemplated. It is intended that the scope of the invention be defined by the following claims and their equivalents.

What is claimed is:

1. A laser system for generating an output beam with high output power, comprising:
    a laser resonator that resonates near a first frequency;
    a first gain medium characterized by thermal focussing, mounted within the laser resonator, providing laser gain near the first frequency in response to pump energy;
    a source of pump energy, coupled with the first gain medium, that supplies pump energy for inducing gain in the first gain medium;
    means, coupled with the first gain medium, for reducing effects of thermal focussing on resonator stability per unit of pump power supplied to the first gain medium;
    a Q-switch mounted within the laser resonator; and
    means, mounted within the laser resonator, for extracting an output beam at a second frequency.

2. The laser system of claim 1, wherein the means for reducing effects of thermal focussing comprises a closely coupled diffuse reflector, enclosing the first gain medium and the source of pump energy.

3. The laser system of claim 1, wherein the means for reducing effects of thermal focussing comprises a second gain medium characterized by thermal focussing, mounted within the laser resonator, coupled with the source of pump energy and spaced from the first gain medium such that both media contribute to power of the output beam while only the effect of thermal focussing in the first gain medium limits resonator stability.

4. The laser system of claim 3, wherein the source of pump energy comprises a first arc lamp coupled with the first gain medium and a second arc lamp coupled with the second gain medium.

5. The laser system of claim 1, wherein the means for reducing effects of thermal focussing comprises a series of gain media mounted within the laser resonator, coupled with the source of pump energy and spaced from the first gain medium such that the series of gain media and the first gain medium contribute to power of the output beam while only the effect of thermal focussing in the first gain medium limits resonator stability.

6. The laser system of claim 1, wherein the means for reducing effects of thermal focussing comprises a filter between the source of pump energy and the first gain medium such that short wavelengths of pump energy are prevented from being absorbed by the first gain medium while allowing longer wavelengths of pump energy to be absorbed by the first gain medium.

7. The laser system of claim 1, wherein the means for reducing effects of thermal focussing comprises a filter between the source of pump energy and the first gain medium such that the filter absorbs short wavelengths of pump energy and fluoresces within a pump band of the first gain medium while allowing long wavelengths of pump energy to transmit through the filter.

8. The laser system of claim 7, wherein the filter comprises alexandrite which fluoresces effectively in pump bands of the first gain medium.

9. The laser system of claim 1, further including:
    means for coupling the output beam into a fiber optic delivery system.

10. The laser system of claim 1, wherein the first gain medium comprises a rod shaped solid state material.

11. The laser system of claim 10, wherein the rod shaped solid state material is selected from a group consisting of Nd:YAG, Nd:YLF and Nd:Glass.

12. The laser system of claim 1, wherein the source of pump energy comprises an arc lamp.

13. The laser system of claim 1, wherein source of pump energy and the means for reducing effects of thermal focussing comprise a narrow band pump energy transducer so that thermal focussing per unit pump power is limited.

14. The laser system of claim 13, wherein the pump energy transducer comprises a semiconductor diode laser.

15. The laser system of claim 1, wherein the second frequency is a second harmonic of the first frequency.

16. The laser system of claim 15, wherein the first frequency has a wavelength of near 1064 nm and the second frequency has wavelength of near 532 nm.

17. The laser system of claim 16, further including:
    a fiber optic delivery system having an input and an output;
    means for coupling the output beam into the input of fiber optic delivery system; and
    wherein the output of the fiber optic delivery system has an average power of over 27 W.

18. The laser system of claim 16, wherein the output beam has an average output power of over 35 W.

19. The laser system of claim 16, wherein the output beam has an average output power of over 46 W.

20. The laser system of claim 16, wherein the output beam has an average output power of over 96 W.

21. The laser system of claim 15, wherein the first frequency has a wavelength near 1318 nm and the second frequency has wavelength near 659 nm.

22. The laser system of claim 21, further including:
a fiber optic delivery system having an input and an output;
means for coupling the output beam into the input of fiber optic delivery system; and
wherein the output of the fiber optic delivery system has an average power of over 6 W.

23. The laser system of claim 21, wherein the output beam has an average output power of over 10 W.

24. The laser system of claim 1, wherein means for extracting an output beam comprises a non-linear optical material.

25. The laser system of claim 24, wherein the non-linear optical material is selected from a group comprising KTP, isomorphs of KTP, LBO, BBO, and polled-glassy-state material.

26. The laser system of claim 24, wherein the laser resonator includes:
an optical relaying means for creating a first relay plane near the first gain medium and second relay plane near the non-linear optical material.

27. A laser system for generating an output beam with high output power, comprising:
a laser resonator that resonates near a first frequency;
a first gain medium characterized by thermal focussing, mounted within the laser resonator, providing laser gain near the first frequency in response to pump energy;
a source of pump energy, coupled with the gain medium, that supplies pump energy to the first gain medium;
a closely coupled diffuse reflector, enclosing the first gain medium and the source of pump energy reducing effects of thermal focussing on resonator stability per unit of pump power supplied to the first gain medium;
a Q-switch mounted within the laser resonator; and
means, mounted within the laser resonator, for extracting an output beam at a second frequency.

28. The laser system of claim 27, further including a filter between the source of pump energy and the first gain medium such that short wavelengths of pump energy are prevented from being absorbed by the first gain medium while allowing longer wavelengths of pump energy to be absorbed by the first gain medium.

29. The laser system of claim 27, further including a filter between the source of pump energy and the first gain medium such that the filter absorbs short wavelengths of pump energy and fluoresces within a pump band of the first gain medium while allowing the long wavelengths of pump energy to transmit through the filter.

30. The laser system of claim 29, wherein the filter comprises alexandrite which fluoresces effectively in pump bands of the first gain medium.

31. The laser system of claim 27, further including:
means for coupling the output beam into a fiber optic delivery system.

32. The laser system of claim 27, wherein the first gain medium comprises a rod shaped solid state material.

33. The laser system of claim 32, wherein the rod shaped solid state material is selected from the group consisting of Nd:YAG, Nd:YLF and Nd:Glass.

34. The laser system of claim 27, wherein the source of pump energy comprises an arc lamp.

35. The laser system of claim 27, wherein the source of pump energy comprises a narrow band pump source.

36. The laser system of claim 35, wherein the narrow band pump source comprises a semiconductor diode laser.

37. The laser system of claim 27, wherein the second frequency is a second harmonic of the first frequency.

38. The laser system of claim 37, wherein the first frequency has a wavelength of near 1064 nm and the second frequency has wavelength of near 532 n.

39. The laser system of claim 38, further including:
a fiber optic delivery system having an input and an output;
means for coupling the output beam into the input of fiber optic delivery system; and
wherein the output of the fiber optic delivery system has an average power of over 6 W.

40. The laser system of claim 38, wherein the output beam has an average output power of over 35 W.

41. The laser system of claim 38, wherein the output beam has an average output power of over 46 W.

42. The laser system of claim 37, wherein the first frequency has a wavelength near 1318 nm and the second frequency has a wavelength near 659 nm.

43. The laser system of claim 42, further including:
a fiber optic delivery system having an input and an output;
means for coupling the output beam into the input of fiber optic delivery system; and
wherein the output of the fiber optic delivery system has an average power of over 6 W.

44. The laser system of claim 42, wherein the output beam has an average output power of over 10 W.

45. The laser system of claim 27, wherein means for extracting an output beam comprises a non-linear optical material.

46. The laser system of claim 45, wherein the non-linear optical material is selected from a group consisting of KTP, isomorphs of KTP, LBO, BBO, and polled-glassy-state material.

47. The laser system of claim 45, wherein the laser resonator includes:
an optical relaying means for creating a first relay plane near the first gain medium and second relay plane near the non-linear optical material.

48. A laser system for generating an output beam with high output power, comprising:
a laser resonator that resonates near a first frequency;
a first gain medium characterized by thermal focussing, mounted within the laser resonator, providing laser gain near the first frequency in response to pump energy;
a first source of pump energy, coupled with the first gain medium, that supplies pump energy to the first gain medium;
a second gain medium characterized by thermal focussing, mounted within the laser resonator, providing laser gain near the first frequency in response to pump energy, spaced from the first gain medium within the laser resonator such that thermal focussing of one of the first and second gain media limits resonator stability;

a second source of pump energy, coupled with the second gain medium, that supplies the pump energy to the second gain medium;

a Q-switch mounted within the laser resonator; and means, mounted within the laser resonator, for extracting an output beam near a second frequency.

49. The laser system of claim 48, further including:

a first closely coupled diffuse reflector, enclosing the first gain medium and the first source of pump energy; and a second closely coupled diffuse reflector, enclosing the second gain medium and the second source of pump energy.

50. The laser system of claim 48, further including at least one additional gain medium mounted within the laser resonator.

51. The laser system of claim 48, further including first and second filters between the first and second sources of pump energy and the first and second gain media, respectively, such that short wavelengths of pump energy are prevented from being absorbed by the first and second gain media while allowing longer wavelengths of pump energy to be absorbed by the first and second gain medium.

52. The laser system of claim 48, further including first and second filters between the first and second sources of pump energy and the first and second gain media, respectively, such that the first and second filters absorb short wavelengths of pump energy and fluoresces within a pump band of the first and second gain media.

53. The laser system of claim 52, wherein the first and second filters comprise alexandrite which fluoresces effectively in pump bands of the first and second gain media.

54. The laser system of claim 48, further including:

means for coupling the output beam into a fiber optic delivery system.

55. The laser system of claim 48, wherein the first and second gain medium comprises rod shaped solid state material.

56. The laser system of claim 55, wherein the rod shaped solid state material is selected from a group consisting of Nd:YAG, Nd:YLF and Nd:Glass.

57. The laser system of claim 48, wherein the first and second sources of pump energy comprise arc lamps.

58. The laser system of claim 48, wherein the first and second sources of pump energy comprise narrow band pump sources.

59. The laser system of claim 58, wherein the narrow band pump sources comprise semiconductor diode lasers.

60. The laser system of claim 48, wherein the second frequency is a second harmonic of the first frequency.

61. The laser system of claim 48, wherein the first frequency has a wavelength of near 1064 nm and the second frequency has a wavelength of near 532 nm.

62. The laser system of claim 61, further including:

a fiber optic delivery system having an input and an output;

means for coupling the output beam into the input of fiber optic delivery system; and wherein the output of the fiber optic delivery system has an average power of over 27 W.

63. The laser system of claim 62, wherein the output beam has an average output power of over 10 W.

64. The laser system of claim 61, wherein the output beam has an average output power of over 35 W.

65. The laser system of claim 61, wherein the output beam has an average output power of over 46 W.

66. The laser system of claim 61, wherein the output beam has an average output power of over 96 W.

67. The laser system of claim 48, wherein the first frequency has a wavelength near 1318 nm and the second frequency has a wavelength near 659 nm.

68. The laser system of claim 67, further including:

a fiber optic delivery system having an input and an output;

means for coupling the output beam into the input of fiber optic delivery system; and wherein the output of the fiber optic delivery system has an average power of over 6 W.

69. The laser system of claim 48, wherein means for extracting an output beam comprises a non-linear optical material.

70. The laser system of claim 69, wherein the non-linear optical material is selected from a group consisting of KTP, isomorphs of KTP, LBO, BBO, and polled-glassy-state material.

71. The laser system of claim 69, wherein the laser resonator includes:

an optical relaying means for creating a first relay plane near the first gain medium and second relay plane near the non-linear optical material.

72. The laser system for generating an output beam with high output power, comprising:

a laser resonator that resonates near a first frequency;

a first gain medium characterized by thermal focussing, mounted within the laser resonator, providing laser gain near the first frequency in response to pump energy;

a first source of pump energy, coupled with the first gain medium, that supplies pump energy to the first gain medium;

a first closely coupled diffuse reflector, enclosing the first gain medium and the first source of pump energy;

a second gain medium characterized by thermal focussing, mounted within the laser resonator, providing laser gain near first frequency in response to pump energy such that both the first and second gain media contribute to power of the output beam while only the thermal focussing in the first gain medium effects resonator stability;

a second source of pump energy, coupled with the second gain medium, that supplies pump energy to the second gain medium;

a second closely coupled diffuse reflector, enclosing the second gain medium and the second source of pump energy;

a Q-switch, mounted within the resonator;

a non-linear optical material, mounted within the resonator responsive to energy near the first frequency to induce energy near a second frequency;

optical relaying means for creating a first relay plane near the first gain medium and second relay plane near the non-linear optical material;

an output coupler for an output beam near the second frequency; and means for coupling the output beam into a fiber optic delivery system for transmitting the output beam to a fiber output;

73. The laser system of claim 72, further including at least one additional gain medium mounted within the laser resonator.

74. The laser system of claim 72, further including first and second filters between the first and second sources of pump energy and the first and second gain media, respectively, such that short wavelengths of pump energy are prevented from being absorbed by the first and second gain media while allowing longer wavelengths of pump energy to be absorbed by the first and second gain media.

75. The laser system of claim 72, further including first and second filters between the first and second sources of pump energy and the first and second gain media, respectively, such that the first and second filters absorb short wavelengths of pump energy and fluoresces within a pump band of the first and second gain media.

76. The laser system of claim 75, wherein the filter comprises alexandrite which fluoresces effectively in pump bands of the first gain medium.

77. The laser system of claim 72, wherein the first and second gain media comprise rod shaped solid state material.

78. The laser system of claim 77, wherein the rod shaped solid state material is selected from a group consisting of Nd:YAG, Nd:YLF and Nd:Glass.

79. The laser system of claim 72, wherein the first and second sources of pump energy comprise arc lamps.

80. The laser system of claim 72, wherein the source of pump energy comprises a narrow band pump source.

81. The laser system of claim 72, wherein the second frequency is a second harmonic of the first frequency.

82. The laser system of claim 81, wherein the first frequency has a wavelength of near 1064 nm and the second frequency has a wavelength of near 532 nm.

83. The laser system of claim 82, wherein the output beam at the fiber output of the fiber optic delivery system has an average power of over 27 W.

84. The laser system of claim 82, wherein the output beam has an average output power of over 35 W.

85. The laser system of claim 81, wherein the first frequency has a wavelength near 1318 nm and the second frequency has a wavelength near 659 nm.

86. The laser system of claim 85, wherein the output beam at the fiber output of the fiber optic delivery system has an average power of over 6 W.

87. The laser system of claim 85, wherein the output beam has an average output power of over 10 W.

88. The laser system of claim 82, wherein the output beam has an average output power of over 46 W.

89. The laser system of claim 82, wherein the output beam has an average output power of over 96 W.

90. The laser system of claim 72, wherein the non-linear optical material is selected from a group consisting of KTP, isomorphs of KTP, LBO, BBO, and polled-glassy-state material.

91. A laser system for generating an output beam with high output power, comprising:
a laser resonator that resonates near a first frequency;
a first gain medium, mounted within the laser resonator, providing laser gain near the first frequency in response to pump energy;
a source of pump energy, coupled with the first gain medium, that supplies pump energy for inducing gain in the first gain medium establishing an average internal fundamental power at the first frequency inside the laser resonator;
a Q-switch mounted within the laser resonator; and
a non-linear optical material mounted within the resonator responsive to the average internal fundamental power near the first frequency to induce energy near a second frequency;
means, mounted within the laser resonator, for extracting an output beam with high output power at the second frequency.

92. The laser system of claim 91, wherein the average internal fundamental power is greater than 900 W.

93. The laser system of claim 91, wherein the average internal fundamental power is greater than 1000 W.

94. The laser system of claim 91, wherein the non-linear optical material is selected from a group consisting of KTP, isomorphs of KTP, LBO, BBO, and polled-glassy-state material.

95. The laser system of claim 84, further including:
a fiber optic delivery system having an input and an output;
means for coupling the output beam into the input of fiber optic delivery system; and
wherein the output of the fiber optic delivery system has an average power of over 27 W.

96. The laser system of claim 94, wherein the first frequency has a wavelength of near 1064 nm and the second frequency has wavelength of near 532 nm.

97. The laser system of claim 96, wherein the output beam has an average output power of over 35 W.

98. The laser system of claim 96, wherein the output beam has an average output power of over 46 W.

99. The laser system of claim 96, wherein the output beam has an average output power of over 96 W.

100. The laser system of claim 94, further including:
a fiber optic delivery system having an input and an output;
means for coupling the output beam into the input of fiber optic delivery system; and
wherein the output of the fiber optic delivery system has an average power of over 6 W.

101. The laser system of claim 100, wherein the first frequency has a wavelength near 1318 nm and the second frequency has wavelength near 659 nm.

102. The laser system of claim 101, wherein the output beam has an average output power of over 10 W.

* * * * *